US005966992A

United States Patent [19]

Kashuba

[11] Patent Number: 5,966,992

[45] Date of Patent: Oct. 19, 1999

[54] COLLAPSIBLE SNOW PROBE

[76] Inventor: Douglas Kashuba, Box 1 Site 218, R.R. #2, St. Albert, Alberta, Canada, T8N 1M9

[21] Appl. No.: 08/837,390

[22] Filed: Apr. 17, 1997

[51] Int. Cl.$^{6}$ .............................. F16C 1/10

[52] U.S. Cl. .............................. 74/500.5; 74/502.4; 74/502.6; 248/231.9; 248/1; 403/312; 464/52

[58] Field of Search .............................. 74/500.5–502.6; 248/231.9, 925, 1; 182/3, 5, 90; 464/52; 403/312

[56] References Cited

U.S. PATENT DOCUMENTS

| | | | |
|---|---|---|---|
| 3,838,607 | 10/1974 | Hemens | 74/501 R X |
| 4,143,446 | 3/1979 | Down | 403/312 X |
| 4,560,365 | 12/1985 | Weaver | 464/52 |
| 4,572,464 | 2/1986 | Phillips | 248/1 |
| 4,643,378 | 2/1987 | Guthrie et al. | 248/1 |
| 4,715,568 | 12/1987 | Best | 248/1 |
| 4,834,327 | 5/1989 | Byrne | 248/231.9 |
| 4,869,342 | 9/1989 | Borst | 182/90 |
| 5,484,132 | 1/1996 | George et al. | 248/231.9 |

*Primary Examiner*—Vinh T. Luong
*Attorney, Agent, or Firm*—Anthony R. Lambert

[57] ABSTRACT

A collapsible snow probe includes a tip and a plurality of elongate tubular members each of which has an interior bore. A cable is provided having a first end and a second end. The first end is secured to the tip. The cable extends through the interior bore of each of the tubular members with the second end protruding. A cable engaging member secured to the cable. A clamping member that clamps onto the cable engaging member and bears against a remote end of the plurality of tubular members when positioned in end to end relation, such that the cable is maintained in tension and the interior bores of the tubular members are maintained in axial alignment.

7 Claims, 4 Drawing Sheets

COLLAPSIBLE SNOW PROBE

FIELD OF THE INVENTION

The present invention relates to a collapsible snow probe.

BACKGROUND OF THE INVENTION

When an avalanche occurs, snow probes are used in a frantic search to find persons buried alive beneath a thick layer of snow. Each probe consists of a slender rod, six or more feet in length, that is used to probe for objects concealed beneath the layer of snow. To facilitate transportation and storage, these probes are manufactured in a plurality of mating sections. Persons buried live beneath the snow will suffocate if not located in a timely fashion. It is, therefore, important that the time required for assembly of equipment be kept to a minimum.

The industry has gone to a snow probe consisting of a plurality of tubular sections connected by a cable. A cable engaging screw member is secured to the cable. A nut is provided that is adapted to be threaded onto the screw member. In order to assemble the collapsible snow probe, the tubular sections are position in end to end relation. The nut is then threaded onto the screw member until it bears against a remote end of the plurality of tubular sections. This maintains the cable in tension and the interior bores of the tubular members are maintained in axial alignment.

Problems have been experienced with the screw and nut engagement. It is difficult to couple the screw member and the nut in cold weather when one is wearing gloves. As a result, the screw member and the nut can become cross-threaded. It takes time to thread the nut onto the screw member. Ice tends to form on the screw member and the nut, making it difficult, if not impossible, to separate the nut from the screw member without first melting the ice. The torque necessary to undo the nut sometimes results in a twisting of the cable. When the cable twists, instead of being loosened, the nut engages the screw member more tightly; so tightly they sometimes must be returned to the factory for removal.

SUMMARY OF THE INVENTION

What is required is a collapsible snow probe that may be rapidly assembled.

According to the present invention there is provided a collapsible snow probe which includes a tip and a plurality of elongate tubular members each of which has an interior bore. A cable is provided having a first end and a second end. The first end is secured to the tip. The cable extends through the interior bore of each of the tubular members with the second end protruding. A cable engaging member secured to the cable. A clamping member that clamps onto the cable engaging member and bears against a remote end of the plurality of tubular members when positioned in end to end relation, such that the cable is maintained in tension and the interior bores of the tubular members are maintained in axial alignment.

The snow probe, as described above, can readily be deployed by positioning the tubular members in end to end relation. The clamping engagement maintains the cable in tension. As long as the cable remains in tension the tubular members will remain relatively rigid.

Although beneficial effects may be obtained through the use of the snow probe, as described above, the stiffening effect of the tensioned cable can be further enhanced when the tubular members are interlocking. Once the tubular members are interlocked, the tensioned cable prevents the separation of the tubular members and thereby maintains the tubular members in their interlocked positioned.

The engagement includes two interacting members, a cable engaging member and a clamping member. The cable engaging member has a tubular body with an interior bore and an exterior surface with a profile that defines a plurality of attachment positions. Means is provided for securing the cable within the interior bore of the tubular body. Once the cable engaging member is affixed to the cable, its position is maintained. The clamping member has a body with an aperture extending therethrough which is sized to receive the tubular body of the cable engaging member. The clamping member has a pressure member which is movable between a releasing position and a locking position. In the releasing position the pressure member is spaced from the aperture so that the clamping member can be slid along the tubular body of the cable engaging member. In the locking position the pressure member engages one of the plurality of attachment positions of the cable engaging member.

The cable engaging member can be permanently affixed to the cable in an effective manner, such as with set screws. The profile on the cable engaging member can include a plurality of annular grooves which defined attachment positions.

Although beneficial effects may be obtained through the use of the engagement, as described above, even more beneficial effects may be obtained when the tubular body of the cable engaging member has a first end and a second end, and each of the annular grooves has an outwardly inclined sidewall toward the second end. The cable engaging member in combination with the clamping member turns the clamping means into a ratchet mechanism with the clamping member being freely movable toward the second end of the cable engaging member, but not movable toward the first end unless the pressure member is moved to the releasing position. The clamping member can then be slid along the cable engaging member until the clamping member bears against the remote end of the plurality of tubular members to maintain the cable in tension. The clamping member can then be fixed in that position by having the pressure member engage one of the annular grooves.

Although beneficial effects may be obtained through the use of the snow probe, as described above, it is preferred that the second end of the cable be formed into a loop. The loop helps prevent the clamping member from being inadvertently removed from the second end of the cable, and serves as a means for attaching the snow probe to a searcher's wrist.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figures 1, 2:
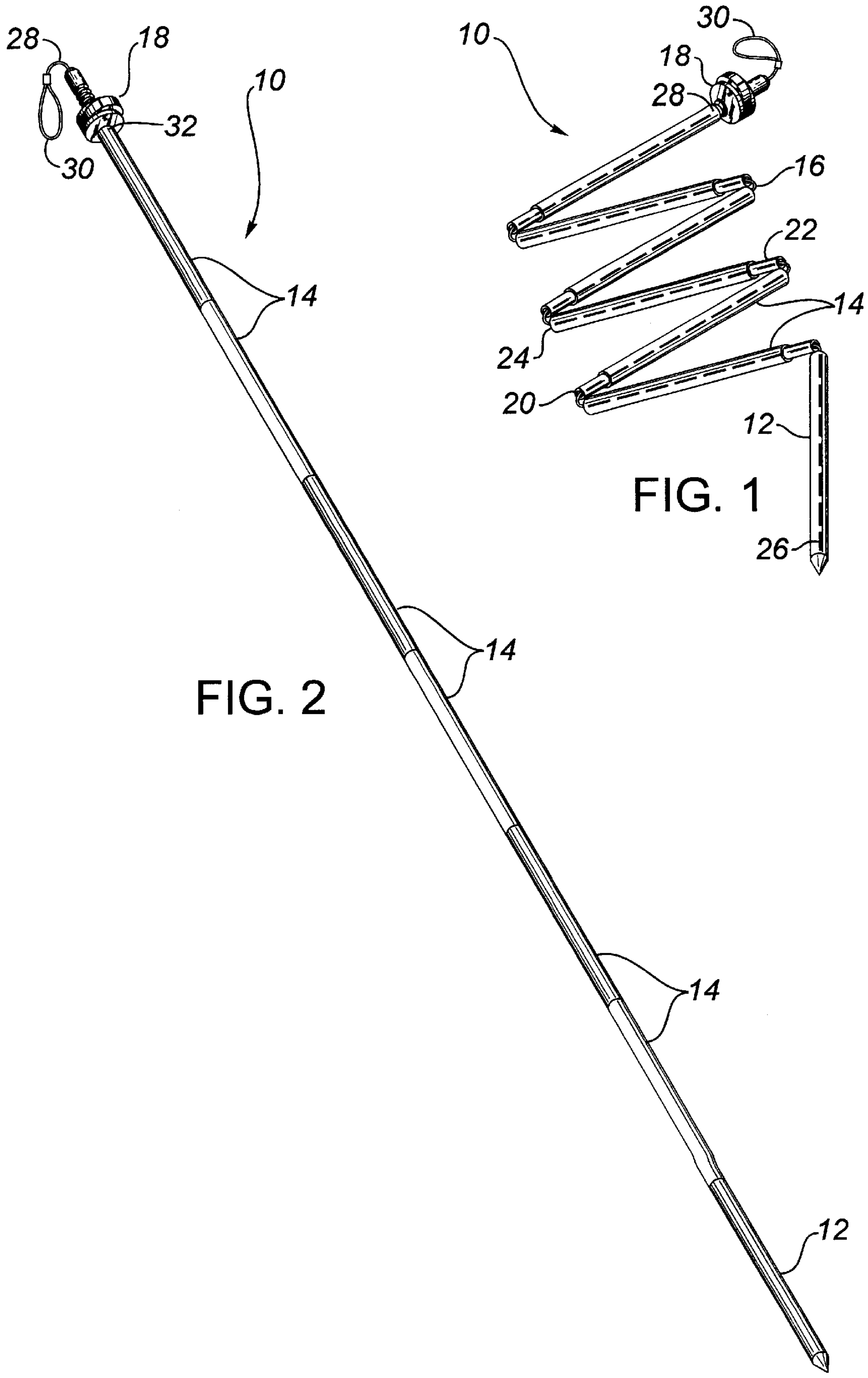
FIG. 1 is a perspective view of a collapsible snow probe constructed in accordance with the teachings of the present invention, in a collapsed state.
FIG. 2 is a perspective view of the collapsible snow probe illustrated in FIG. 1, in an assembled state.

The preferred embodiment, a collapsible snow probe generally identified by reference numeral 10, will now be described with reference to FIGS. 1 through 4.

Figure 3:
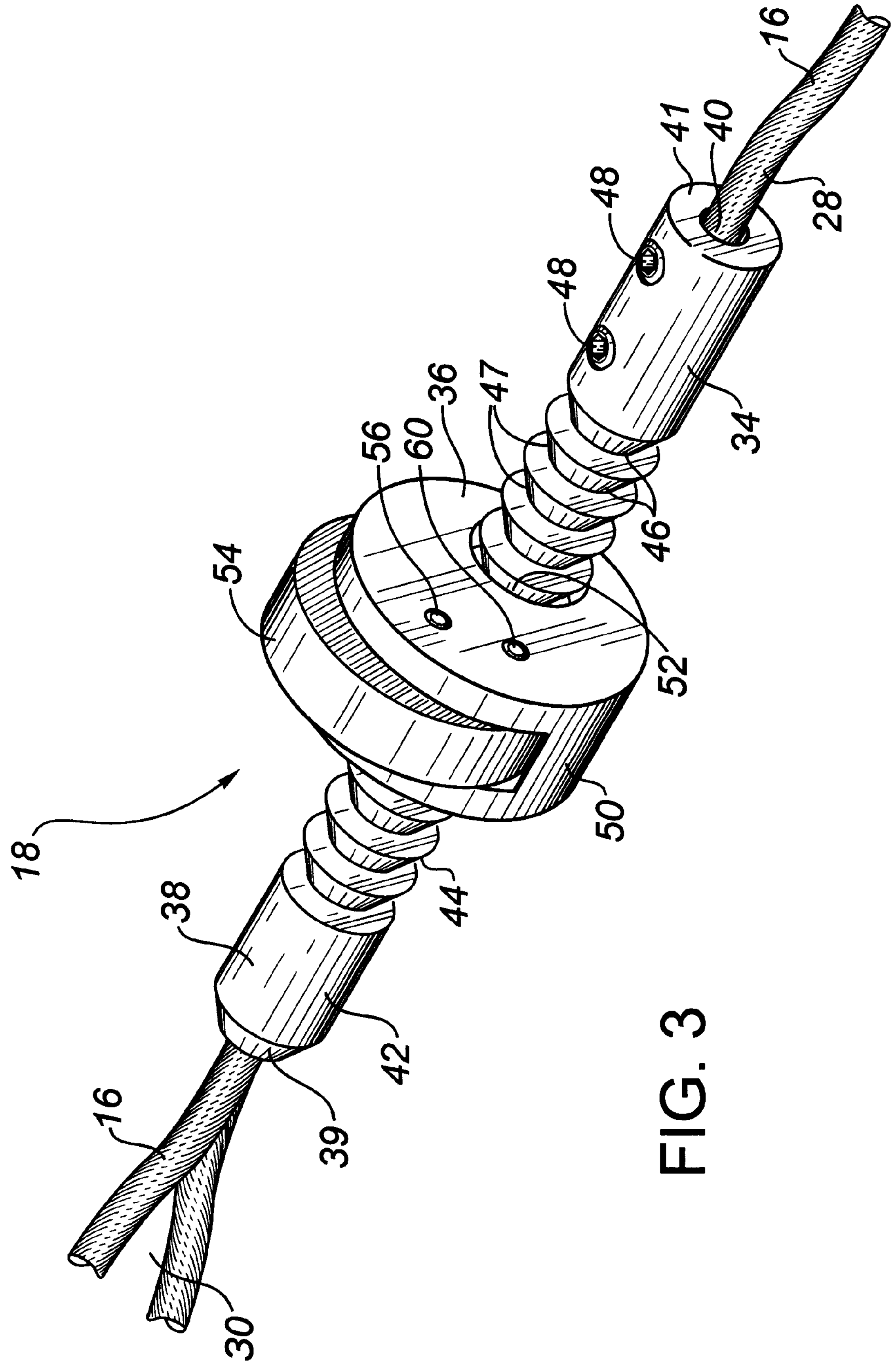
FIG. 3 is a perspective view of the two part clamping means for the collapsible snow probe illustrated in FIGS. 1 and 2.
Figure 4:
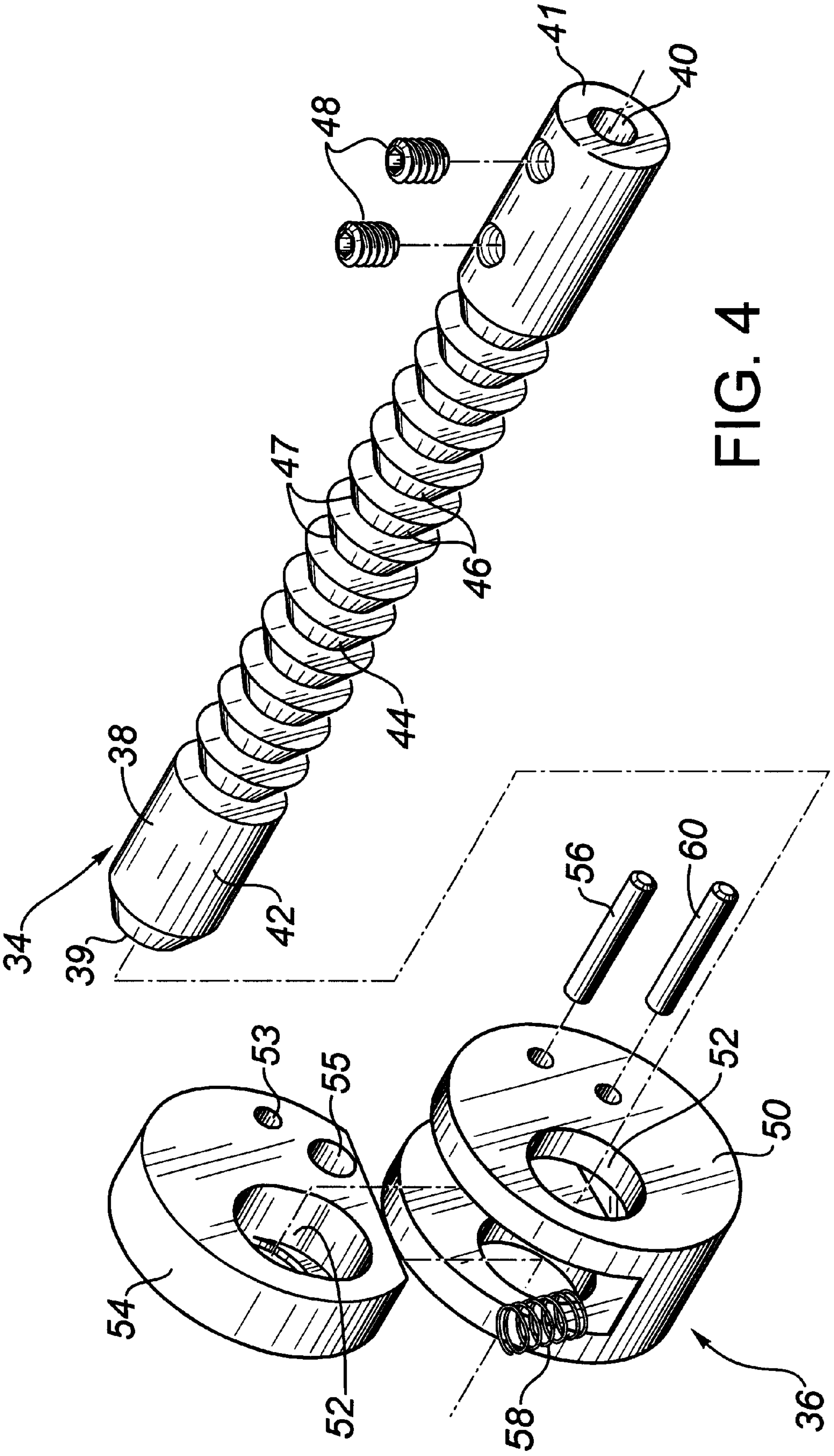
FIG. 4 is an exploded perspective view of the two part clamping means for the collapsible snow probe illustrated in FIGS. 3.
Figure 5:
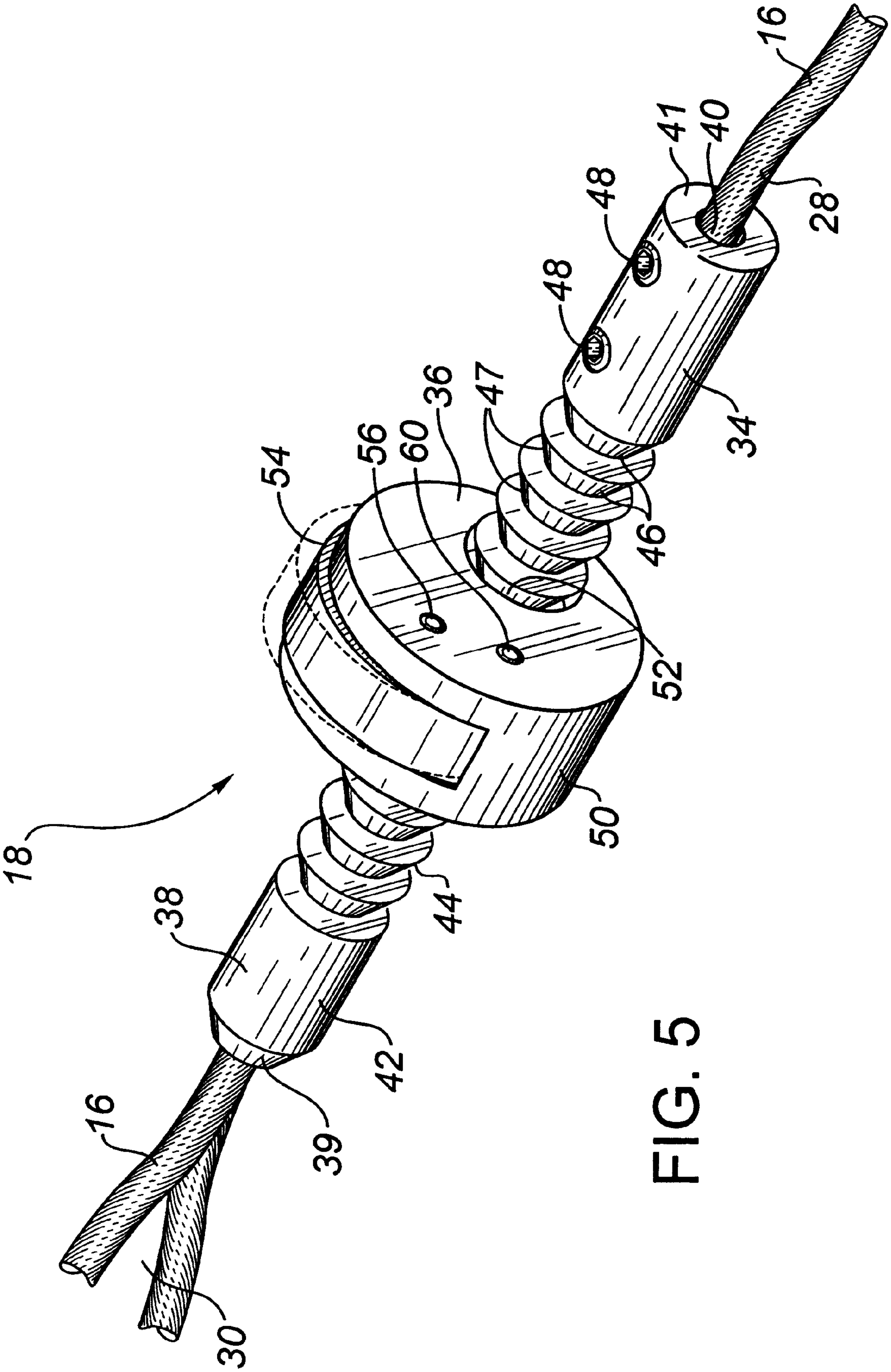
FIG. 5 is a perspective view of the snow probe in a releasing position.

Referring to FIG. 1, collapsible snow probe 10 includes a tip 12, a plurality of tubular members 14, a cable 16, and a clamping means, generally identified by reference numeral 18. Plurality of elongate tubular members 14 each has an interior bore 20. Tubular members 14 are preferably interlocking, and to facilitate such interlocking each has a male end 22 and a female end 24. Cable 16 has a first end 26 and a second end 28. First end 26 is secured to tip 12. Cable 16 extends through interior bore 20 of each of tubular members 14 with second end 28 protruding from elongate tubular members 14 and forming a loop 30. Collapsible snow probe 10 is shown in a collapsed state in FIG. 1 and in an assembled state in FIG. 2. Referring to FIG. 2, in the assembled state elongate tubular members 14 are positioned in end to end relation with male ends 22 and female ends 24 interlocking. Clamping means 18 bears against a remote end 32 of plurality of tubular members 14 and engages second end 28 of cable 16. This maintains cable 16 in tension and interior bores 20 of tubular members 14 in axial alignment to give snow probe 10 rigidity in the transition from the collapsed state to the assembled state. Referring to FIGS. 3 and 4, clamping means 18 includes a cable engaging member 34 and a clamping member 36. Cable engaging member 34 has a tubular body 38 with a first end 39, a second end 41, an interior bore 40 and an exterior surface 42. Exterior surface 42 has a profile 44 which includes a plurality of annular grooves 46. Each of annular grooves 46 defines an attachment position. Each of annular grooves 46 has one sidewall 47 which is outwardly inclined toward second end 41 of tubular body 38 of cable engaging member 34. Cable 16 extends through interior bore 40 of tubular body 38 of cable engaging members 34, and is secured to cable 16 by means of set screws 48. Once attached to cable 16, cable engaging member 34 is not intended to be moved. Clamping member 36 has a body 50 with an aperture 52 extending therethrough. Aperture 52 is sized to receive tubular body 38 of cable engaging member 34. Clamping member 36 has a pivotally mounted cam-like pressure member 54 which pivots about pivot pin 56. Cam-like pressure member 54 is biased by a spring 58 toward the locking position. Stop means in the form of a stop pin 60 is provided to limit such movement, so that pressure member does not lose spring 58. Pressure member 54 has aperture 52, an aperture 53 to receive pivot pin 56 and an enlarged movement limiting aperture 55 to receive stop pin 60. Pressure member 54 is pivotally movable between a releasing position illustrated in FIG. 5 and a locking position illustrated in FIG. 3. In the releasing position pressure member 54 is spaced from aperture 52 so that clamping member 36 can freely slide along tubular body 38 of cable engaging member 34. In the locking position, pressure member 54 engages one of the plurality of annular grooves 46 on cable engaging member 34.

The use and operation of collapsible snow probe will now be described with reference to FIGS. 1 through 4. Clamping means 18 requires the cooperative interaction of two components cable engaging member 34 which is permanently affixed to cable 16, and clamping member 36. When clamping member 36 is spaced from cable engaging member 34, cable 16 has sufficient slack that tubular members can be separated and folded up to fit into a storage bag (not shown) as illustrated in FIG. 1. When snow probe 10 is required, it is rapidly assembled by placing elongate tubular members 14 in end to end relation and interlocking male ends 22 and female ends 24, as illustrated in FIG. 2. In order to maintain snow probe 10 in an assembled condition, clamping member 36 must be engaged with cable engaging member 34. Referring to FIGS. 3 and 4, this is accomplished by exerting pressure upon clamping member 36 to force clamping member 36 to slide as far as it will go toward second end 41 of tubular body 38 of cable engaging member. The outwardly inclined sidewalls 47 of annular grooves 46, result in cable engaging member 34 in combination with clamping member 36 turns clamping means 18 into a ratchet mechanism. Clamping member 36 will freely move toward second end 41 of cable engaging member 34, but will not move back toward first end 39 unless pressure member 54 is moved to the releasing position by depressing pressure member 54 to overcome the biasing force of spring 58, spaced from aperture 52. Clamping member 36 is slid along cable engaging member 34 until it engages and exerts pressure upon remote end 32 of plurality of tubular members 14. This pressure maintains tubular members 14 interlocked, as relative movement of the tubular members is required to permit male ends 22 to be withdrawn from female ends 24. Pressure member 54 assumes the locking position, engaging one of the plurality of annular grooves 46 on cable engaging member 34. When snow probe 10 is to be returned to a collapsed state, pressure is exerted upon pressure member 54 to overcome the biasing force of spring 58 and place pressure member 54 in the releasing position. In the releasing position, clamping member 36 may be slid toward first end 39 of cable engaging member 34 or separated entirely, to leave slack on cable 16. Once there is sufficient slack on cable 16, male end 22 may be withdrawn from female ends 24 to separate the interlocked tubular members 14, so they may be folded for storage, as illustrated in FIG. 2.

It will be apparent to one skilled in the art that snow probe 10 overcomes the problems that existed with the screw member and nut engagement. The ratchet-like action enables rapid assembly, even when one is wearing gloves. The clamping engagement does not require torque to be applied to separate the cable engaging member and the clamping member, so twisting of the cable does not occur. The clamping member cannot become frozen as the pressure member crushes any ice that may have formed in the annular groove where it is positioned. Cable engaging member 34 can be made in any cross-sectional shape or dimension, as long as it can mate with the aperture in clamping member 36. Similarly, tubular members 14 can be made of square tubing or tubing of other cross-sectional areas. It will also be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A collapsible snow probe, comprising:

a tip;

a plurality of elongate tubular members, each of which has an interior bore;

a cable having a first end and a second end, the first end being secured to the tip, the cable extending through the interior bore of each of the tubular members with the second end protruding;

a cable engaging member secured to the cable; and a clamping member that clamps onto the cable engaging member and bears against a remote end of the plurality of tubular members when positioned in end to end relations, such that the cable is maintained in tension and the interior bores of the tubular members are maintained in axial alignment;

the cable engaging member having a tubular body with an interior bore and an exterior surface with a plurality of grooves that define a plurality of attachment positions, and means for securing a cable within the interior bore of the tubular body; and the clamping member having a body with an aperture extending therethrough sized to receive the tubular body of the cable engaging member, the clamping member having a pressure member which is movable between a releasing position and a locking position, in the releasing position the pressure member being spaced from the aperture so that the clamping member is slidable along the tubular body of the cable engaging member, in the locking position the pressure member engaging one of the plurality of grooves of the cable engaging member.

2. The collapsible snow probe as defined in claim 1, wherein the tubular members are interlocking.

3. The collapsible snow probe as defined in claim 1, wherein the second end of the cable is formed into a loop.

4. The collapsible snow probe as defined in claim 1, wherein the plurality of grooves are annular grooves.

5. The collapsible snow probe as defined in claim 1, wherein the tubular body of the cable engaging member has a first end and a second end, each of the plurality of grooves has an outwardly inclined sidewall toward the second end, such that the cable engaging member in combination with the clamping member forms a ratchet mechanism with the clamping member being freely movable toward the second end of the cable engaging member, but not movable toward the first end unless the pressure member is moved to the releasing position.

6. A collapsible snow probe, comprising:

a tip;

a plurality interlocking elongate tubular members each of which has an interior bore, each of the interlocking tubular members having a male end and a female end;

a cable having a first end and a second end, the first end being secured to the tip, the cable extending through the interior bore of each of the tubular members with the second end protruding from the elongate tubular members and forming a loop; and a clamping member which, when the elongate tubular members are positioned in end to end relation with the male ends and the female ends interlocking, bears against a remote end of the plurality of tubular members and engages the second end of the cable, such that the cable is maintained in tension and the interior bores of the tubular members maintained in axial alignment, the clamping means including:

a cable engaging member having tubular body with an interior bore and an exterior surface with a plurality of annular grooves that define attachment positions, and set screws securing the cable within the interior bore of the tubular body;

the clamping member having a body with an aperture extending therethrough sized to receive the tubular body of the cable engaging member, the clamping member having a pivotally mounted cam-like pressure member which is movable between a releasing position and a locking position, in the releasing position the pressure member being spaced from the aperture so that the clamping member is slidable along the tubular body of the cable engaging member, in the locking position the pressure member engaging one of the plurality of annular grooves of the cable engaging member, the cam-like clamping member being biased by a spring toward the locking position, stop means being provided to limit such movement.

7. The collapsible snow probe as defined in claim 6, wherein the tubular body of the cable engaging member has a first end and a second end, the annular grooves each having an outwardly inclined sidewall toward the second end, such that the cable engaging member in combination with clamping member forms a ratchet mechanism with the clamping member being freely movable toward the second end of the cable engaging member, but not movable toward the first end unless the pressure member is moved to the releasing position.

* * * * *